(12) United States Patent
Hwang et al.

(10) Patent No.: US 8,339,555 B2
(45) Date of Patent: Dec. 25, 2012

(54) IN-PLANE SWITCHING LIQUID CRYSTAL DISPLAY DEVICE HAVING IMPROVED BRIGHTNESS AND APERTURE RATIO

(75) Inventors: Han-Wook Hwang, Seoul (KR); Young-Hak Lee, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 660 days.

(21) Appl. No.: 11/171,470

(22) Filed: Jun. 29, 2005

(65) Prior Publication Data

US 2006/0066798 A1 Mar. 30, 2006

(30) Foreign Application Priority Data

Sep. 30, 2004 (KR) .................. 10-2004-0077920

(51) Int. Cl.
*G02F 1/1343* (2006.01)
(52) U.S. Cl. ......................................... 349/141
(58) Field of Classification Search .................. 349/141
See application file for complete search history.

(56) References Cited

U.S. PATENT DOCUMENTS

| | | | | |
|---|---|---|---|---|
| 6,476,900 B1* | 11/2002 | Lee et al. | | 349/141 |
| 6,747,722 B2* | 6/2004 | Ono et al. | | 349/141 |
| 2001/0010576 A1* | 8/2001 | Lee et al. | | 349/141 |
| 2002/0154262 A1* | 10/2002 | Yamakita et al. | | 349/141 |
| 2003/0043329 A1* | 3/2003 | Park | | 349/141 |
| 2004/0051834 A1* | 3/2004 | Lee | | 349/141 |
| 2004/0212768 A1* | 10/2004 | Wu et al. | | 349/141 |

FOREIGN PATENT DOCUMENTS

| | | |
|---|---|---|
| JP | 10-062802 | 3/1998 |
| KR | 10-0293808 | 4/2001 |

OTHER PUBLICATIONS

Office Action issued in corresponding Korean Patent Application No. 10-2004-0077920; issued Feb. 14, 2011.

* cited by examiner

*Primary Examiner* — Lauren Nguyen
(74) *Attorney, Agent, or Firm* — Brinks Hofer Gilson & Lione (57) ABSTRACT

An in-plane switching liquid crystal display device includes a gate line and a data line on a substrate, the gate and data lines crossing each other to define a pixel region, a thin film transistor electrically connected to the gate and data lines, a pixel electrode connected to the thin film transistor, and a common electrode alternately arranged with the pixel electrode to form n blocks in the pixel region. Widths of some of the blocks are different than widths of other of the blocks.

26 Claims, 8 Drawing Sheets

IN-PLANE SWITCHING LIQUID CRYSTAL DISPLAY DEVICE HAVING IMPROVED BRIGHTNESS AND APERTURE RATIO

This application claims the benefit of Korean Patent Application No. 2004-0077920, filed on Sep. 30, 2004, which is hereby incorporated by reference for all purposes as if fully set forth herein.

FIELD OF THE INVENTION

The present invention relates to a liquid crystal display (LCD) device. More particularly, the present invention relates to an in-plane switching liquid crystal display (IPS LCD) device.

DISCUSSION OF THE RELATED ART

Due to the rapid development in information technology, display devices have evolved into instruments that can process and display a great deal of information. Flat panel display (FPD) devices, which have the properties of a thin profile, low weight and low power consumption, have been developed.

Among the FPD devices, liquid crystal display (LCD) devices are widely used for notebook computers and desktop monitors because of their excellent characteristics of resolution, color display and display quality.

The liquid crystal display (LCD) devices use the optical anisotropy and polarization properties of liquid crystal molecules to produce an image. Liquid crystal molecules have a definite alignment as a result of their long, thin shapes and are arranged to have initial pretilt angles. The alignment direction can be controlled by applying an electric field. Specifically, variations in an applied electric field influence the alignment of the liquid crystal molecules. Due to the optical anisotropy, the refraction of incident light depends on the alignment direction of the liquid crystal molecules. Thus, by properly controlling the applied electric field, an image that has a desired brightness can be produced.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superior ability in displaying moving images In general, a liquid crystal display (LCD) device includes two substrates, which are spaced apart and face each other, and a liquid crystal layer interposed between the two substrates. Each of the substrates includes an electrode, and the electrodes of each substrate also face each other. A voltage is applied to each electrode, and an electric field is induced between the electrodes. An arrangement of the liquid crystal molecules is changed by varying the intensity of the electric field.

However, since the electrodes are positioned on the two substrates, respectively, the electric field induced between the electrodes is perpendicular to the lower and upper substrates. Accordingly, the related art LCD devices have a narrow viewing angle because of the longitudinal electric field.

In order to solve the problem of narrow viewing angle, in-plane switching liquid crystal display (IPS-LCD) devices have been proposed. An IPS-LCD device includes a pixel electrode and a common electrode on the same substrate.

Figure 1:
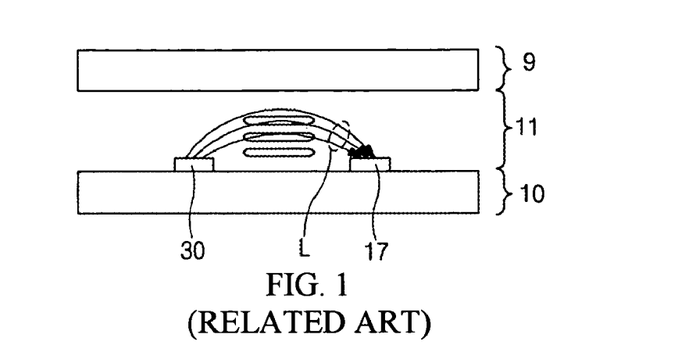
FIG. 1 is a schematic cross-sectional view illustrating a concept of a related art IPS-LCD device.

FIG. 1 is a schematic cross-sectional view illustrating a concept of a related art IPS-LCD device. As shown in FIG. 1, upper and lower substrates 9 and 10 are spaced apart from each other, and a liquid crystal layer 11 is interposed therebetween. The upper and lower substrates 9 and 10 are often referred to as a color filter substrate and an array substrate, respectively. On the lower substrate 10 are a common electrode 17 and a pixel electrode 30. The common and pixel electrodes 17 and 30 are aligned substantially parallel to each other. On a surface of the upper substrate 9, a color filter layer (not shown) is commonly positioned between the pixel electrode 30 and the common electrode 17 of the lower substrate 10. A voltage applied across the common and pixel electrodes 17 and 30 produces an electric field L, which is parallel to the upper and lower substrates 9 and 10, through liquid crystal molecules of the liquid crystal layer 11. The liquid crystal layer 11 has a positive dielectric anisotropy, and thus the liquid crystal molecules align substantially parallel to the electric field L.

Figure 2A:
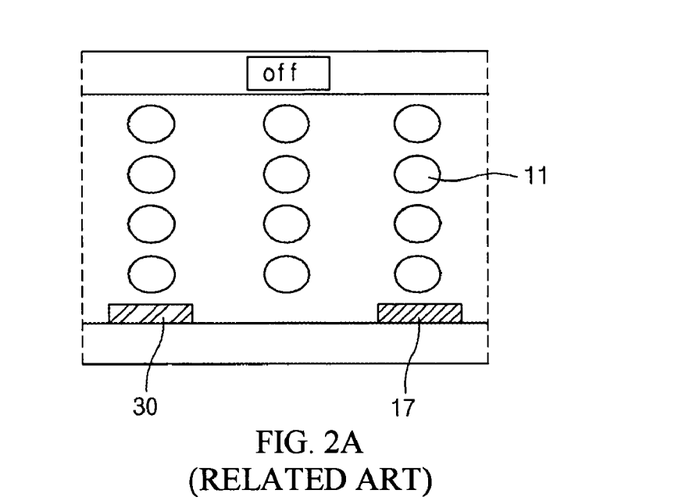
FIGS. 2A and 2B are cross-sectional views of an IPS LCD device according to the related art.
Figure 2B:
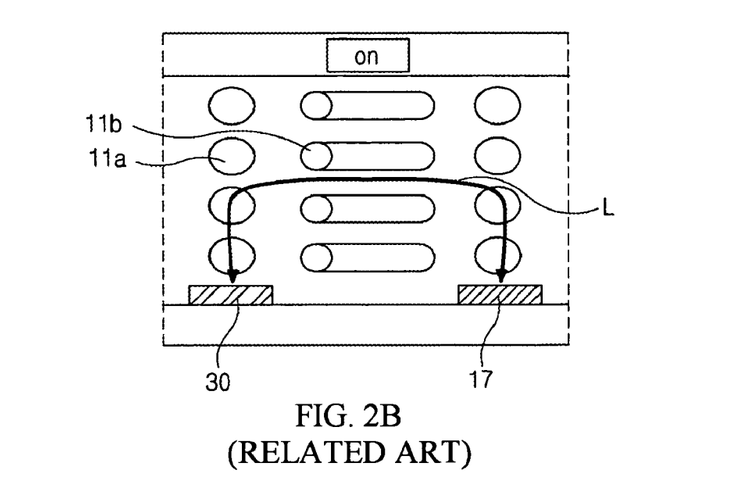

FIGS. 2A and 2B are cross-sectional views of an IPS LCD device according to the related art, and illustrate operations of liquid crystal molecules for the IPS mode in OFF and ON states.

FIG. 2A conceptually illustrates an OFF state operation mode for the related art IPS LCD device. In the OFF state, because there is no electric field between the two electrodes 17 and 30, the liquid crystal molecules 11 maintain an initial arrangement according to an alignment layer, which is made by a method such as rubbing. Thus, the long axes of the liquid crystal molecules 11 are parallel to the common and pixel electrodes 17 and 30 on a lower substrate.

FIG. 2B conceptually illustrates an ON state operation mode for the related art IPS LCD device. In the ON state, a lateral electric field L parallel to the substrates is generated between the pixel and common electrodes 30 and 17. Thus, the liquid crystal molecules 11b between the pixel and common electrodes 30 and 17 are aligned such that long axes thereof are parallel to the substrates and perpendicular to the pixel and common electrodes 30 and 17, while the liquid crystal molecules 11a over the pixel and common electrodes 30 and 17 maintain an initial arrangement e.g., parallel to the pixel and common electrodes 30 and 17 because an electric field vertical to the substrates is induced over the pixel and common electrodes 30 and 17.

The result is a wide viewing angle that ranges from about 80 to 85 degrees in up-and-down and left-and-right directions from a line vertical to the IPS-LCD device, for example.

Figure 3:
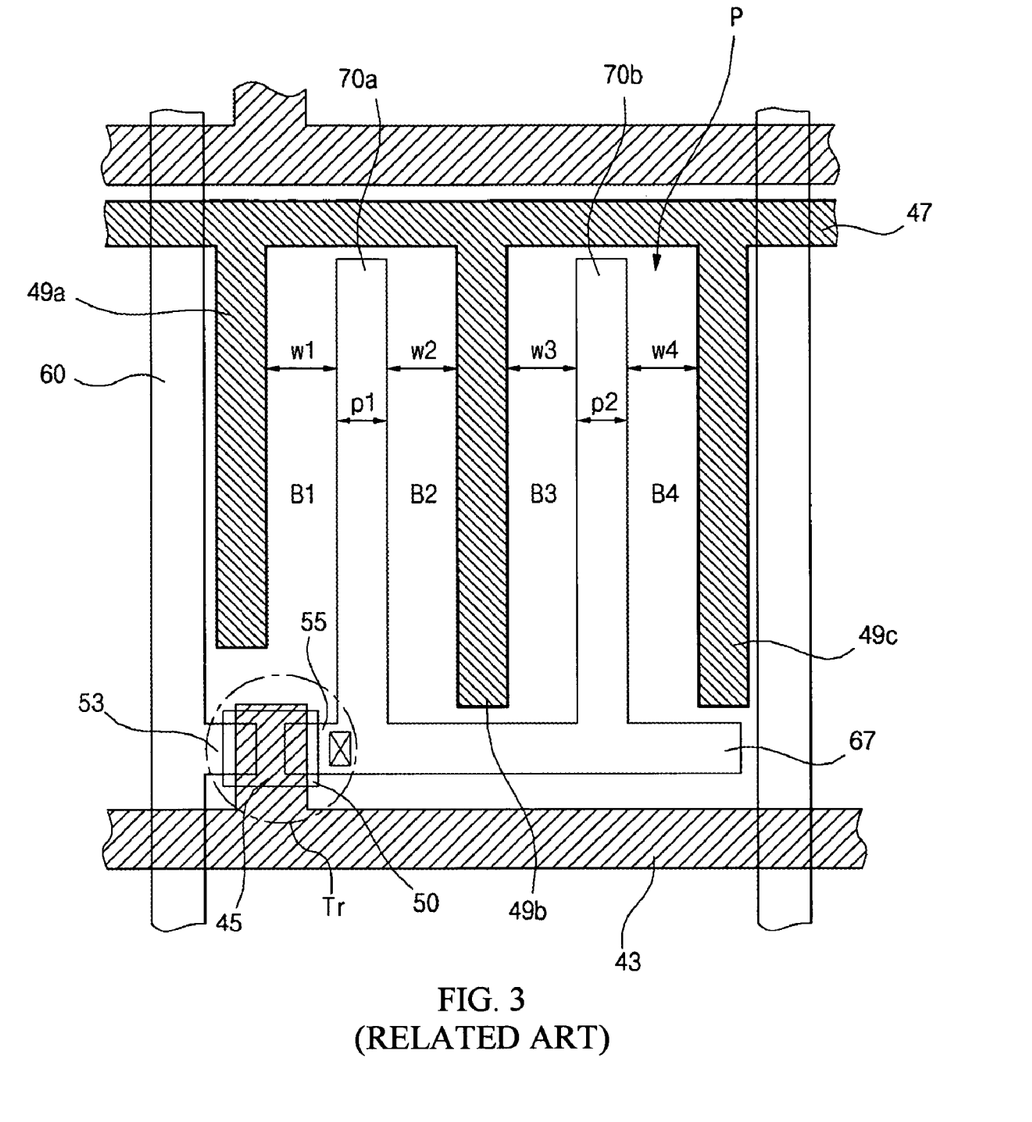
FIG. 3 is a plan view of a related art IPS LCD device.

FIG. 3 is a plan view of a related art in-plane switching liquid crystal display (IPS LCD) device. As illustrated in FIG. 3, gate lines 43 are formed horizontally in the context of the figure on a substrate, and a common line 47 parallel to the gate lines 43 is formed between adjacent gate lines 43. Data lines 60 are formed vertically in the context of the figure on the substrate. The gate and data lines 43 and 60 cross each other to define a pixel region P. A thin film transistor Tr is formed at a crossing portion of the gate and data lines 43 and 60 as a switching element. The thin film transistor Tr includes a gate electrode 45, a semiconductor layer 50, a source electrode 53 and a drain electrode 55. The gate electrode 45 extends from the gate line 43, and the source electrode 53 extends from the data line 60.

In the pixel region P, a pixel electrode and a common electrode are formed. The pixel electrode includes first and second portions 70a and 70b, and the common electrode includes first, second and third parts 49a, 49b and 49c. The pixel electrode 70a and 70b alternates the common electrode 49a, 49b and 49c. That is, the first portion 70a of the pixel electrode is disposed between the first and second parts 49a and 49b of the common electrode, and the second portion 70b of the pixel electrode is disposed between the second and third parts 49b and 49c of the common electrode. The first and third parts 49a and 49c of the common electrode are adjacent to the data lines 60. The first and second portions 70a and 70b of the pixel electrode are connected to a pixel electrode connecting line 67 and are electrically connected to the drain electrode 55 through the pixel electrode connecting line 67. The common electrode 49a, 49b and 49c extends from the common line 47.

Four blocks B1, B2, B3 and B4 are formed in the pixel region P. The four blocks B1, B2, B3 and B4 are defined as spaces between the parts 49a, 49b and 49c of the common electrode and the portions 70a and 70b of the pixel electrode. Widths w1, w2, w3 and w4 of the four blocks B1, B2, B3 and B4 are the same. Widths p1 and p2 of the first and second portions 70a and 70b of the pixel electrode are also the same.

As stated above, the IPS LCD device has a wide viewing angle. However, in the IPS LCD device, since the pixel and common electrodes are formed in the pixel region, the aperture ratio is reduced, and thus the brightness is decreased.

Furthermore, the brightness may be non-uniform over the IPS LCD device.

Figure 4:
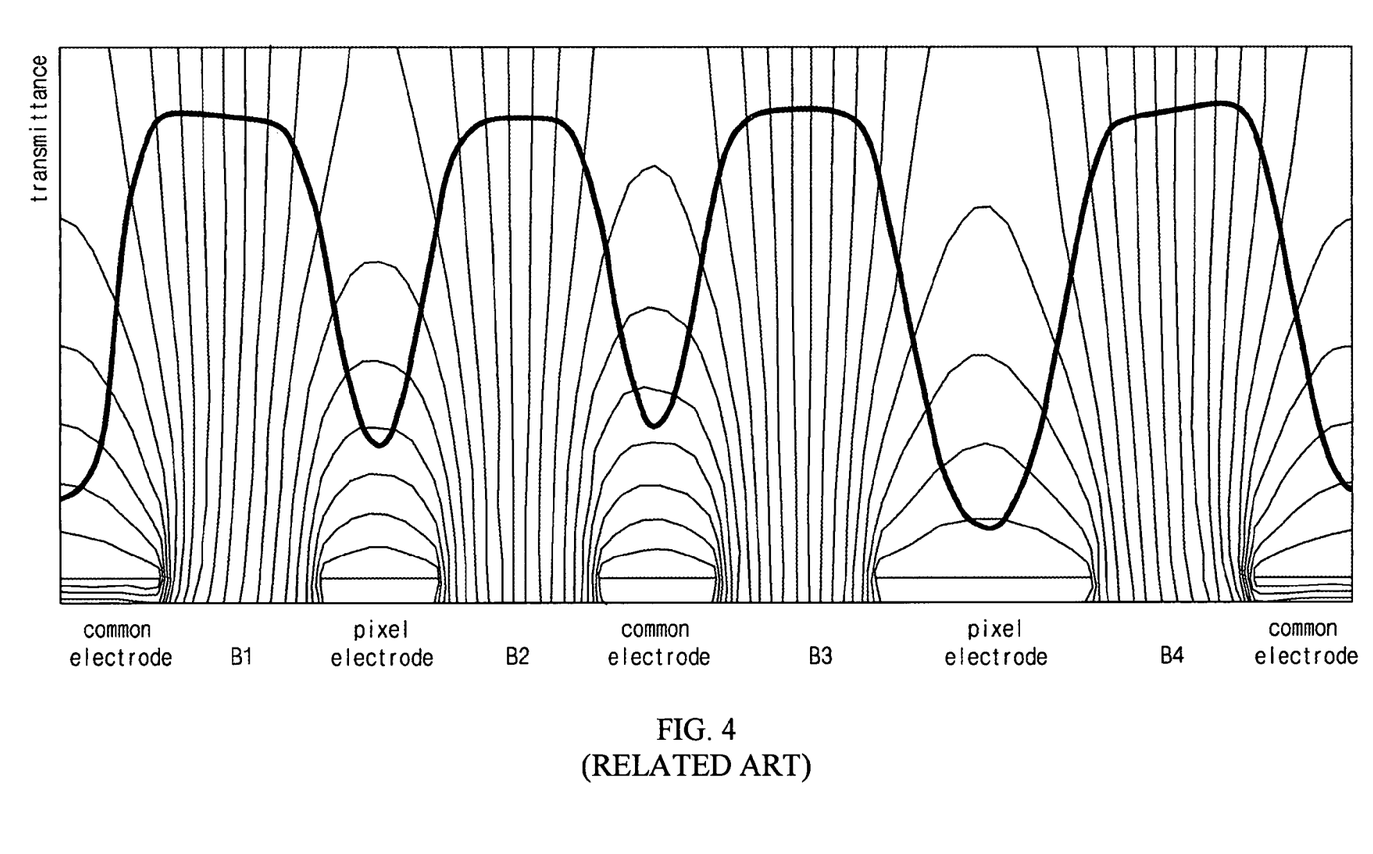
FIG. 4 is a view illustrating simulation of light transmittance in one pixel region of the IPS LCD device of FIG. 3.

FIG. 4 is a view illustrating simulation of light transmittance in one pixel region of the IPS LCD device of FIG. 3. In FIG. 4, first, second, third and fourth blocks B1, B2, B3 and B4 are formed between common and pixel electrodes, and the blocks B1, B2, B3 and B4 have the same width. The first and fourth blocks B1 and B4 are adjacent to data lines. Peaks in the first and fourth blocks B1 and B4 have wider widths than peaks in the second and third blocks B2 and B3. Additionally, the peaks in the first and fourth blocks B1 and B4 incline toward the data lines.

Therefore, although the blocks have the same width, light transmittances are not equal in the blocks. The brightness is not uniform due to differences in the light transmittances of the blocks to thereby produce poor images.

SUMMARY OF THE INVENTION

By way of introduction only, in one aspect an in-plane switching liquid crystal display device includes a gate line and a data line on a substrate. The gate and data lines cross each other to define a pixel region. A thin film transistor is electrically connected to the gate and data lines. A pixel electrode is connected to the thin film transistor. A common electrode is alternately arranged with the pixel electrode to form first to nth (n is a natural number) blocks in the pixel region. Widths of the first and nth blocks are wider than widths of the second to (n−1)th blocks.

In another aspect, an in-plane switching liquid crystal display device includes a gate line and a data line on a substrate. The gate and data lines cross each other to define a pixel region. A thin film transistor is electrically connected to the gate and data lines. N (n is a natural number) common electrodes are disposed on the substrate. (n−1) pixel electrodes are connected to the thin film transistor and are alternately arranged with the n common electrodes to form 2(n−1) blocks in the pixel region. Widths of first and 2(n−1)th blocks are wider than widths of second to (2n−1)th blocks.

In another aspect, an in-plane switching liquid crystal display device includes a gate line and a data line on a substrate. The gate and data lines cross each other to define a pixel region. A switch is electrically connected to the gate and data lines. A pixel electrode is connected to the switch and has a plurality of portions. A common line parallel with the gate line has a common electrode with a plurality of parts that are alternately arranged with the portions of the pixel electrode to form blocks therebetween. A width of at least one of the blocks is different than a width of another of the blocks.

In another aspect, a method of fabricating an in-plane switching liquid crystal display device comprises: forming a gate line and a data line on a substrate, the gate and data lines crossing each other to define a pixel region; forming a switch electrically connected to the gate and data lines; forming a pixel electrode connected to the switch, the pixel electrode having a plurality of portions; and forming a common line parallel with the gate line, the common line having a common electrode with a plurality of parts that are alternately arranged with the portions of the pixel electrode to form blocks therebetween. The parts and portions are formed such that electric fields in the blocks most distal from a center of the pixel region are weaker than electric fields in the blocks most proximate to the center of the pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 5:
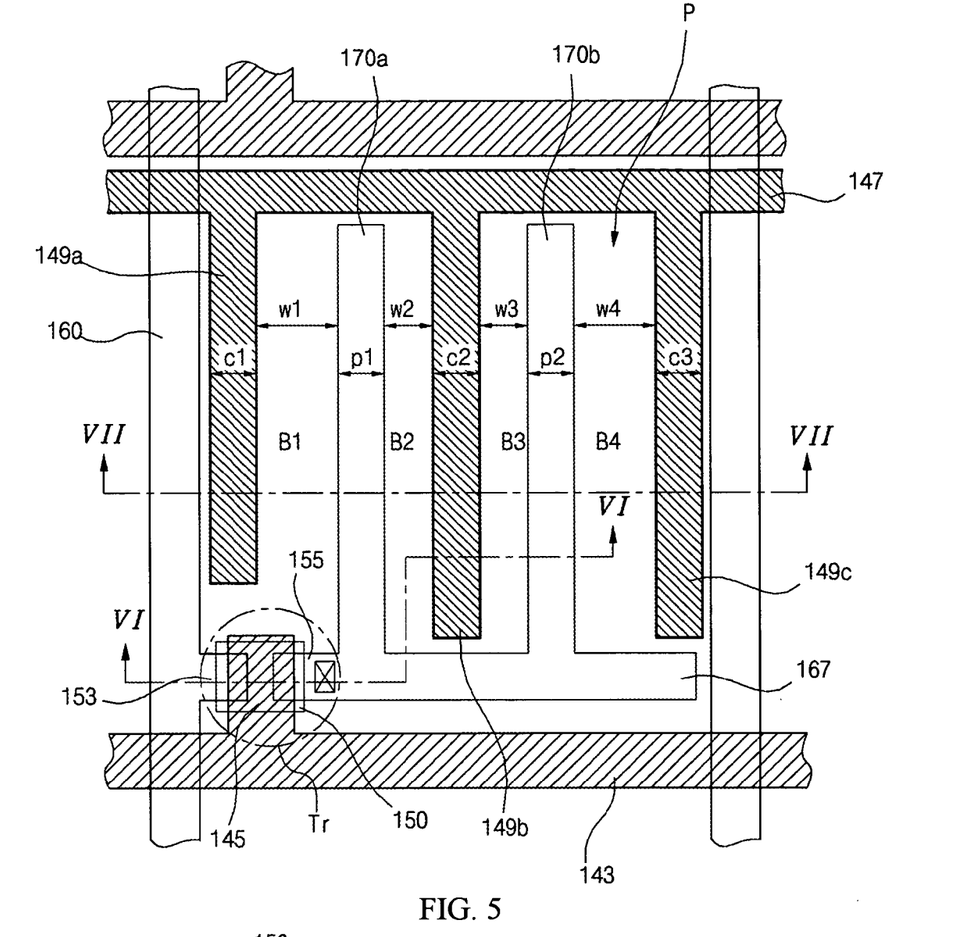
FIG. 5 is a plan view of an IPS LCD device according to a first embodiment of the present invention.

FIG. 5 is a plan view of an in-plane switching liquid crystal display (IPS LCD) device according to a first embodiment of the present invention.

As illustrated in FIG. 5, gate lines 143 are formed on a substrate along a first direction, and a common line 147 parallel to the gate lines 143 is formed between adjacent gate lines 143. Data lines 160 are formed on the substrate along a second direction perpendicular to the first direction. The gate and data lines 143 and 160 cross each other to define a pixel region P. A thin film transistor Tr is formed at a crossing portion of the gate and data lines 143 and 160 as a switching element. The thin film transistor Tr includes a gate electrode 145, a semiconductor layer 150, a source electrode 153 and a drain electrode 155. The gate electrode 145 extends from the gate line 143, and the source electrode 153 extends from the data line 160.

In the pixel region P, a pixel electrode and a common electrode are formed. The pixel electrode includes first and second portions 170a and 170b, and the common electrode includes first, second and third parts 149a, 149b and 149c. The portions 170a and 170b of the pixel electrode and the parts 149a, 149b and 149c of the common electrode are parallel to the data lines 160. The pixel electrode 170a and 170b alternates with the common electrode 149a, 149b and 149c. That is, the first portion 170a of the pixel electrode is disposed between the first and second parts 149a and 149b of the common electrode, and the second portion 170b of the pixel electrode is disposed between the second and third parts 149b and 149c of the common electrode. The first and third parts 149a and 149c of the common electrode are adjacent to the data lines 160. Even though the first and third parts 149a and 149c of the common electrode are spaced apart from the data lines 160, the first and third parts 149a and 149c of the common electrode may overlap the data lines 160. The first and second portions 170a and 170b of the pixel electrode are connected to a pixel electrode connecting line 167 and are electrically connected to the drain electrode 155 through the pixel electrode connecting line 167. The common electrode 149a, 149b and 149c extends from the common line 147.

Figure 6:
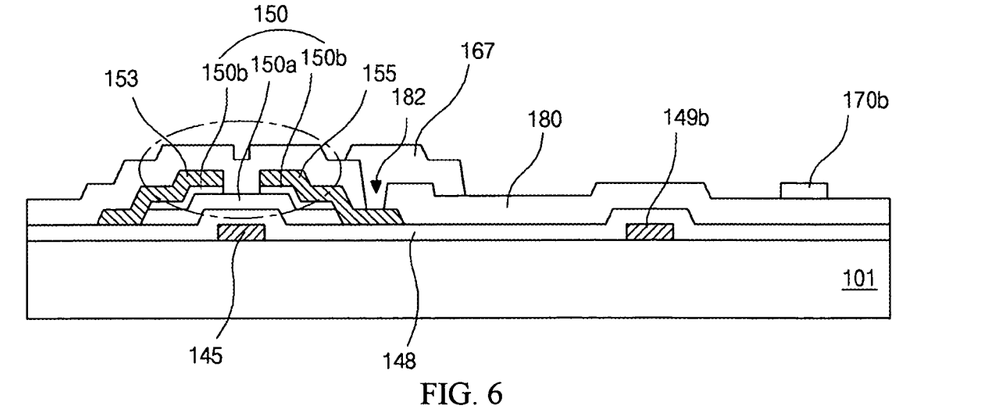
FIG. 6 is a cross-sectional view along the line VI-VI of FIG. 5.
Figure 7:
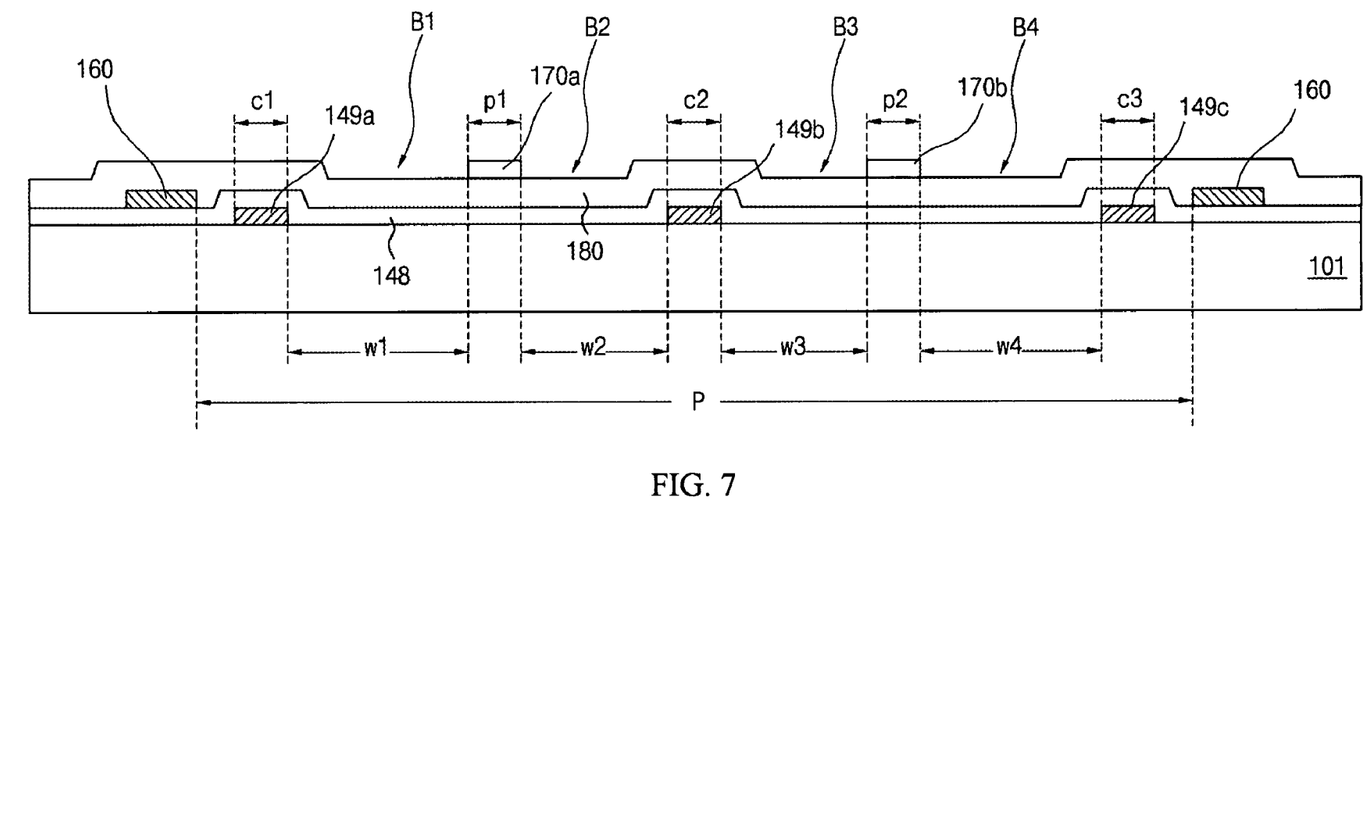
FIG. 7 is a cross-sectional view along the line VII-VII of FIG. 5.

FIG. 6 is a cross-sectional view along the line VI-VI of FIG. 5, and FIG. 7 is a cross-sectional view along the line VII-VII of FIG. 5.

In FIGS. 6 and 7, a gate electrode 145, a gate line (not shown), a common line (not shown), and a common electrode including first, second and third parts 149a, 149b and 149c are formed on a substrate 101. A gate insulating layer 148 is formed on the gate electrode 145, the gate line, the common line, and the common electrode 149a, 149b and 149c. A semiconductor layer 150 is formed on the gate insulating layer 148 over the gate electrode 145. The semiconductor layer 150 includes an active layer 150a and an ohlnic contact layer 150b. A data line 160 is formed on the gate insulating layer 148, and source and drain electrodes 153 and 155 are formed on the semiconductor layer 150. As stated above, the data line 160 crosses the gate line and the common line, and the source electrode 153 is connected to the data line 160. The gate line and the data line 160 define a pixel region P. The source and drain electrodes 153 and 155 are spaced apart from each other. A passivation layer 180 is formed on the source and drain electrodes 153 and 155, the data line 160 and the gate insulating layer 148. The passivation layer 180 includes a contact hole 182 exposing the drain electrode 155. A pixel electrode including first and second portions 170a and 170b and a pixel electrode connecting line 167 are formed on the passivation layer 180. The pixel electrode connecting line 167 is connected to the drain electrode 155 through the contact hole 182. Although not shown in the figures, the pixel electrode 170a and 170b is connected to the pixel electrode connecting line 167. The first and second portions 170a and 170b of the pixel electrode alternate the first, second and third parts 149a, 149b and 149c of the common electrode. Although the pixel electrode 170a and 170b is formed on the passivation layer 180, the pixel electrode 170a and 170b may be formed of the same material as the source and drain electrodes 153 and 155 on the gate insulating layer 148.

As above, four blocks B1, B2, B3 and B4 are formed in the pixel region P. The four blocks B1, B2, B3 and B4 are defined as spaces between the parts 149a, 149b and 149c of the common electrode and the portions 170a and 170b of the pixel electrode. More particularly, a first block B1 is formed between the first part 149a of the common electrode and the first portion 170a of the pixel electrode, a second block B2 is formed between the first portion 170a of the pixel electrode and the second part 149b of the common electrode, a third block B3 is formed between the second part 149b of the common electrode and the second portion 170b of the pixel electrode, and a fourth block B4 is formed between the second portion 170b of the pixel electrode and the third part 149c of the common electrode.

As shown in FIG. 5, widths w1 and w4 of the first and fourth blocks B1 and B4 are wider than widths w2 and w3 of the second and third blocks B2 and B3. In one embodiment, the widths w1 and w4 of the first and fourth blocks B1 and B4 are more than 1 μm wider than widths w2 and w3 of the second and third blocks B2 and B3. The widths w1 and w4 of the first and fourth blocks B1 and B4 are substantially the same, and the widths w2 and w3 of the second and third blocks B2 and B3 are substantially the same. In addition, widths p1 and p2 of the first and second portions 170a and 170b of the pixel electrode are the same, and widths c1, c2 and c3 of the first, second and third parts 149a, 149b and 149c are also the same.

The above-mentioned structure can be realized by moving the first and second portions of the pixel electrode.

That is, the first and second portions 170a and 170b of the pixel electrode shift toward the second part 149b of the common electrode as compared with the related art in which the widths of the first, second, third and fourth blocks are the same. The first, second and third parts 149a, 149b and 149c of the common electrode do not move. A shift width of the first and second portions 170a and 170b of the pixel electrode is more than 0.5 μm. Therefore, the widths w1 and w4 of the first and fourth blocks B1 and B4 widen, and the widths w2 and w3 of the second and third blocks B2 and B3 get narrow in comparison with the related art.

In the embodiment of FIG. 5, since the widths w1 and w4 of the first and fourth blocks B1 and B4 are wider than the widths w2 and w3 of the second and third blocks B2 and B3, electric fields in the first and fourth blocks B1 and B4 are weaker than electric fields in the second and third blocks B2 and B3. Accordingly, liquid crystal molecules are less arranged in the first and fourth blocks B1 and B4 than in the second and third blocks B2 and B3 when a voltage is applied to the pixel and common electrodes, and transmittances in the blocks B1, B2, B3 and B4 are uniform.

Figure 8:
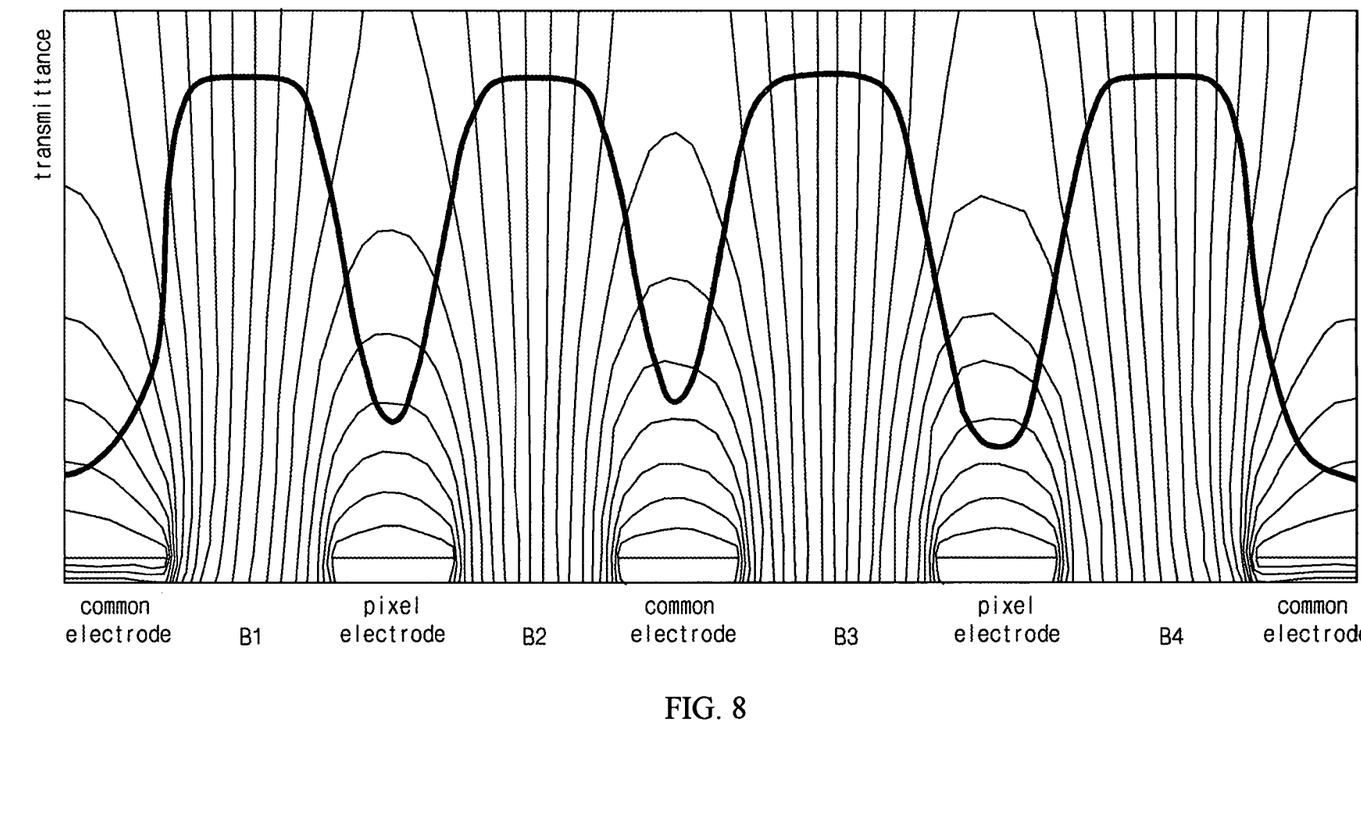
FIG. 8 is a view illustrating simulation of light transmittance in one pixel region of an IPS LCD device according to the first embodiment of the present invention.

FIG. 8 is a view illustrating simulation of light transmittance in one pixel region of an IPS LCD device according to the first embodiment of the present invention. As illustrated in FIG. 8, first, second, third and fourth blocks B1, B2, B3 and B4 are formed between common and pixel electrodes. Here, the first and fourth blocks B1 and B4 are adjacent to data lines, and the first and fourth blocks B1 and B4 have a wider width than the second and third blocks B2 and B3. Peaks in the first, second, third and fourth blocks B1, B2, B3 and B4 have substantially uniform widths. In addition, the peaks in the first and fourth blocks B1 and B4 do not inclined toward the data lines and are substantially flat.

Therefore, brightness of the IPS LCD device is uniform in the pixel region, and image quality is improved. In addition, in the first embodiment, the widths of the common and pixel electrodes are the same as those in the related art. Thus, the aperture ratio is substantially the same as that of the related art.

Figure 9A:
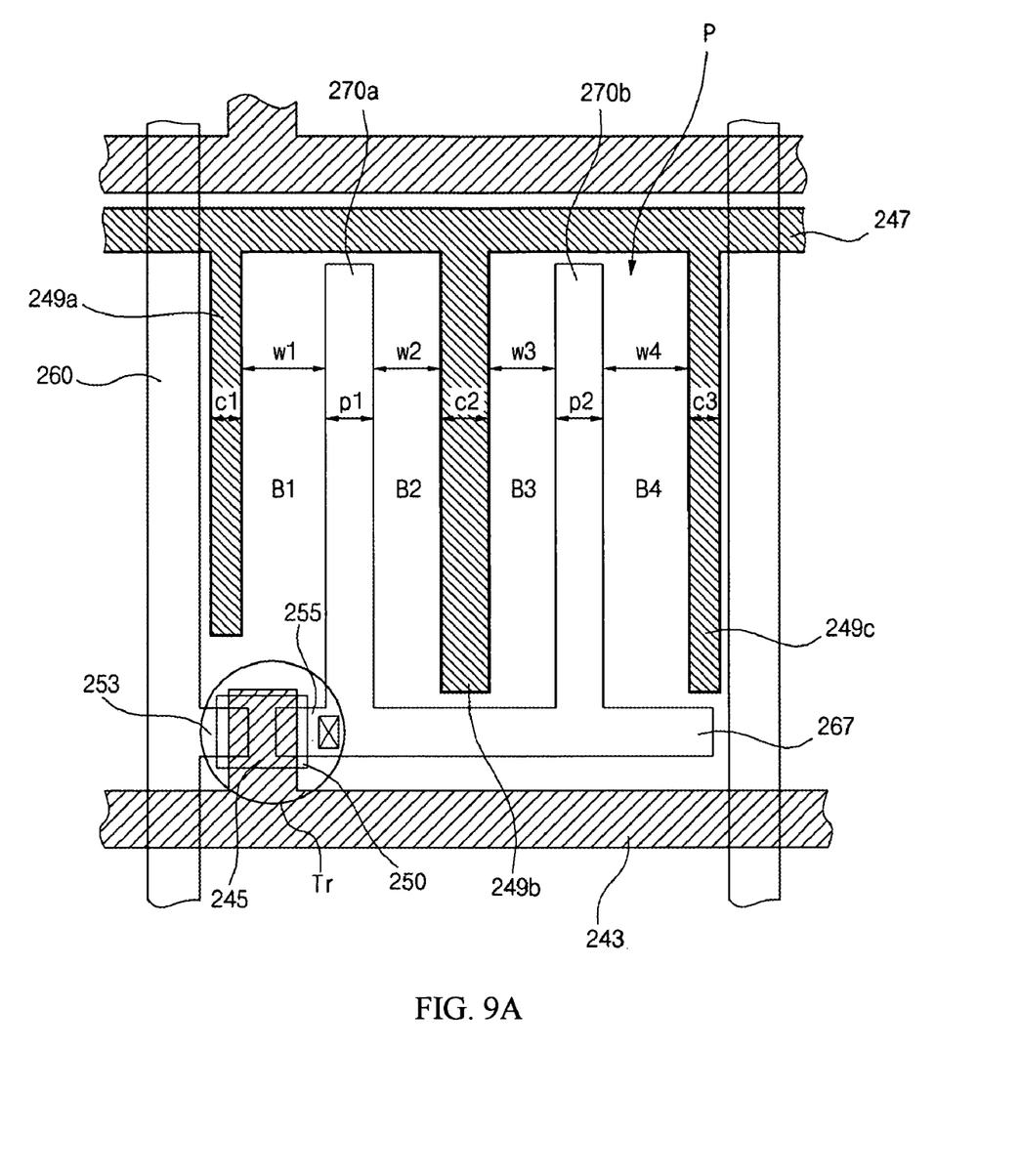
FIGS. 9A and 9B are plan views of an IPS LCD device according to a second embodiment of the present invention.
Figure 9B:
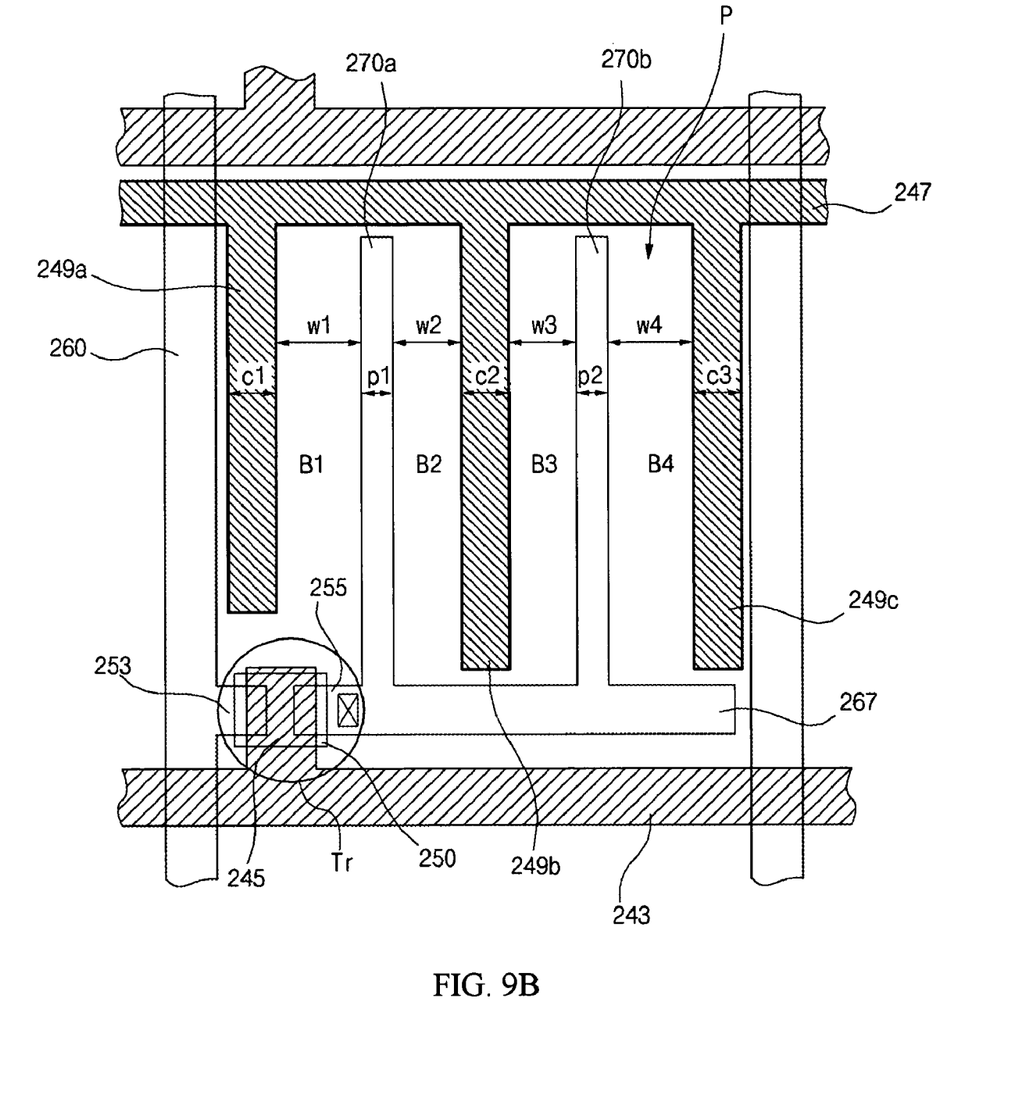

A second embodiment of the present invention shows an IPS LCD device having an increased aperture ratio in comparison with the first embodiment. FIGS. 9A and 9B are plan views of an IPS LCD device according to a second embodiment of the present invention.

In FIGS. 9A and 9B, gate lines 243 are formed on a substrate along a first direction, and a common line 247 parallel to the gate lines 243 is formed between adjacent gate lines 243. Data lines 260 are formed on the substrate along a second direction perpendicular to the first direction. The gate and data lines 243 and 260 cross each other to define a pixel region P. A thin film transistor Tr is formed at a crossing portion of the gate and data lines 243 and 260 as a switching element. The thin film transistor Tr includes a gate electrode 245, a semiconductor layer 250, a source electrode 253 and a drain electrode 255. The gate electrode 245 extends from the gate line 243, and the source electrode 253 extends from the data line 260.

In the pixel region P, a pixel electrode and a common electrode are formed. The pixel electrode includes first and second portions 270a and 270b, and the common electrode includes first, second and third parts 249a, 249b and 249c. The portions 270a and 270b of the pixel electrode and the parts 249a, 249b and 249c of the common electrode are parallel to the data lines 260. The pixel electrode 270a and 270b alternates the common electrode 249a, 249b and 249c. That is, the first portion 270a of the pixel electrode is disposed between the first and second parts 249a and 249b of the common electrode, and the second portion 270b of the pixel electrode is disposed between the second and third parts 249b and 249c of the common electrode. The first and third parts 249a and 249c of the common electrode are adjacent to the data lines 260. Even though the first and third parts 249a and 249c of the common electrode are spaced apart from the data lines 260, the first and third parts 249a and 249c of the common electrode may overlap the data lines 260. The first and second portions 270a and 270b of the pixel electrode are connected to a pixel electrode connecting line 267 and is electrically connected to the drain electrode 255 through the pixel electrode connecting line 267. The common electrode 249a, 249b and 249c extends from the common line 247.

First, second, third and fourth blocks B1, B2, B3 and B4 are formed in the pixel region P. The first, second, third and fourth blocks B1, B2, B3 and B4 are defined as spaces between the parts 249a, 249b and 249c of the common electrode and the portions 270a and 270b of the pixel electrode. Widths w1 and w4 of the first and fourth blocks B1 and B4 are wider than widths w2 and w3 of the second and third blocks B2 and B3. The widths w1 and w4 of the first and fourth blocks B1 and B4 are more than 1 μm wider than widths w2 and w3 of the second and third blocks B2 and B3.

The widths w1 and w4 of the first and fourth blocks B1 and B4 are substantially the same, and the widths w2 and w3 of the second and third blocks B2 and B3 are substantially the same. In the second embodiment, widths of the portions of the pixel electrode or the parts of the common electrode addition are changed to thereby form blocks having different widths.

More particularly, in FIG. 9A, widths c1 and c3 of the first and third parts 249a and 249c of the common electrode are deceased as compared to the first embodiment and are narrower than width c2 of the second part 249b of the common electrode. The first and second portions 270a and 270b of the pixel electrode have the same width as those of the first embodiment. The first part 249a of the common electrode is patterned more than 1 μm from the right side of the first part of the first embodiment in the context of the figure. The third part 249c of the common electrode is patterned more than 1 μm from the left side of the first part of the first embodiment in the context of the figure. Thus, the first and fourth blocks B1 and B4 have wider widths than the second and third blocks B2 and B3.

On the other hand, in FIG. 9B, widths p1 and p2 of the portions 270a and 270b of the pixel electrode are decreased as compared to the first embodiment. The first, second and third parts 249a, 249b and 249c of the common electrode have the same width as those of the first embodiment. The widths p1 and p2 of the first and second portions 270a and 270b of the pixel electrode are narrower than the widths c1, c2 and c3 of the first, second and third parts 249a, 249b and 249c of the common electrode. The first portion 270a of the pixel electrode is patterned more than 1 μm from the left side of the first portion of the first embodiment in the context of the figure. The second portion 270b of the pixel electrode is patterned more than 1 μm from the right side of the first portion of the first embodiment in the context of the figure. Therefore, the first and fourth blocks B1 and B4 have wider widths than the second and third blocks B2 and B3.

Accordingly, brightness of the IPS LCD device is uniform in the pixel region, and image quality is improved. In addition, the pixel electrode or the common electrode has the decreased width, and the aperture ratio of the IPS LCD device is increased.

The first and second embodiments can be used separately or combined, as desired. However, since the common and pixel electrodes have widths of more than a predetermined value to function properly, this limits the width decrease of the common and pixel electrodes. Accordingly, the brightness of the device may be uniform and the aperture ratio of the device may increase by shifting the pixel electrode and decreasing the width of the pixel electrode or by shifting the pixel electrode and decreasing the width of the common electrode.

In the present invention, although four blocks are formed in a pixel region, six or more blocks may be formed in a pixel region. When n (n is a natural number) blocks are formed in a pixel, widths of first and nth blocks adjacent to data lines are wider than widths of second to (n−1)th blocks by applying the first and second embodiments.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device, comprising:
   a gate line along a first direction and a data line along a second direction on a substrate, the gate and data lines crossing each other to define a pixel region;
   a thin film transistor electrically connected to the gate and data lines;
   a pixel electrode electrically connected to the thin film transistor and having a plurality of portions;
   a pixel connecting line parallel to the gate line, the pixel connecting line overlapping and contacting a drain electrode of the thin film transistor;
   a common electrode having a plurality of parts, which are alternately arranged with the portions of the pixel electrode to form first to nth (n is a natural number) blocks in the pixel region;
   a common line parallel with the gate line and connected to the common electrode, the common line connected to a common electrode in a next pixel region adjacent to the pixel region along the first direction and disposing between the gate line and a previous gate line adjacent to the gate line, wherein a first distance between the common line and the previous gate line is shorter than a second distance between the common line and the gate line, wherein the first distance is shorter than lengths of the pixel electrode and the common electrode, and the second distance is longer than the lengths of the pixel electrode and the common electrode; and a gate insulating layer on the gate line and the common electrode, wherein the data line is on the gate insulating layer, wherein widths of the first and nth blocks are wider than widths of the second to (n−1)th blocks, wherein the widths of the first and nth blocks are the same and the widths of the second to (n−1)th blocks are the same, wherein the blocks from the first to nth block in the pixel region are formed without overlapping with any of the plurality of portions of the pixel electrode or any of the plurality of parts of the common electrode in the pixel region, wherein the common electrode is branched directly from a side of the common line, wherein the pixel electrode is branched directly from the pixel connecting line, and wherein the common electrode and the common line are spaced apart from the pixel electrode and the pixel connecting line along the first and second directions, wherein each of the parts and portions has the same width, wherein the width of the parts is the same as the width of the portions, wherein the pixel electrode is formed in a plane higher than a plane where the common electrode is formed and does not overlap with the common electrode when viewed in a cross section taken along a thickness direction of the in-plane switching liquid crystal display device wherein one of the parts of the common electrode has a shorter length than the remaining parts of the common electrode.

2. The device according to claim 1, wherein the widths of the first and nth blocks are more than 1 micrometers wider than the widths of the second to (n−1)th blocks.

3. The device according to claim 1, wherein the common electrode includes first to mth parts (m is a natural number) that alternate with the pixel electrode, and the first and mth parts have narrower widths than the second to (m−1)th parts.

4. The device according to claim 1, wherein the pixel electrode includes first to mth portions (m is a natural number) that alternate with the common electrode, and the first and mth portions have narrower widths than the second to (m−1)th portions.

5. The device according to claim 1, wherein n equals four.

6. The device according to claim 5, wherein the pixel electrode has first and second portions, and the common electrode has first, second and third parts that alternate with the first and second portions.

7. The device according to claim 6, wherein the first and second portions of the pixel electrode have narrower widths than the first, second and third parts of the common electrode.

8. The device according to claim 6, wherein the first and third parts of the common electrode have narrower widths than the second part of the common electrode.

9. The device according to claim 8, wherein the first and third parts of the common electrode have narrower widths than the first and second portions of the pixel electrode.

10. An in-plane switching liquid crystal display device, comprising:

a gate line along a first direction and a data line along a second direction on a substrate, the gate and data lines crossing each other to define a pixel region;

a thin film transistor electrically connected to the gate and data lines;

n (n is a natural number) common electrodes on the substrate;

(n−1) pixel electrodes electrically connected to the thin film transistor and alternately arranged with the n common electrodes to form 2(n−1) blocks in the pixel region;

a pixel connecting line parallel to the gate line, the pixel connecting line overlapping and contacting a drain electrode of the thin film transistor; and a common line parallel with the gate line and connected to the common electrodes, the common line connected to common electrodes in a next pixel region adjacent to the pixel region along the first direction and disposing between the gate line and a previous gate line adjacent to the gate line, wherein a first distance between the common line and the previous gate line is shorter than a second distance between the common line and the gate line, wherein the first distance is shorter than lengths of the pixel electrode and the common electrode, and the second distance is longer than the lengths of the pixel electrode and the common electrode; and a gate insulating layer on the gate line and the common electrodes, wherein the data line is on the gate insulating layer, wherein widths of first and 2(n−1)th blocks are wider than widths of second to (2n−1)th blocks, wherein the widths of the first and 2(n−1)th blocks are the same and the widths of the second to (2n−1)th blocks are the same, wherein the blocks from the first to nth block in the pixel region are formed without overlapping with any of the plurality of portions of the pixel electrode or any of the plurality of parts of the common electrode in the pixel region, wherein the common electrodes are branched directly from a side of the common line, wherein the pixel electrodes are branched directly from the pixel connecting line, and wherein the common electrodes and the common line are spaced apart from the pixel electrodes and the pixel connecting line along the first and second directions wherein each of the common electrodes and the pixel electrodes has the same width, wherein the width of the common electrodes is the same as the width of the pixel electrodes, wherein the pixel electrode is formed in a plane higher than a plane where the common electrode is formed and does not overlap with the common electrode when viewed in a cross section taken along a thickness direction of the in-plane switching liquid crystal display device wherein one of the parts of the common electrode has a shorter length than the remaining parts of the common electrode.

11. The device according to claim 10, wherein the widths of the first and 2(n−1)th blocks are more than 1 micrometers wider than the widths of the second to (2n−1)th blocks.

12. The device according to claim 10, wherein the first and nth common electrodes have narrower widths than the second to (n−1)th common electrodes.

13. The device according to claim 10, wherein the first and (n−1)th pixel electrodes have narrower widths than the second to (n−2)th pixel electrodes.

14. The device according to claim 10, wherein n is three.

15. The device according to claim 14, wherein first and second pixel electrodes have narrower widths than first, second and third common electrodes.

16. The device according to claim 14, wherein first and third common electrodes have narrower widths than a second common electrode between the first and third common electrodes.

17. The device according to claim 16, wherein the first and third common electrodes have narrower widths than first and second pixel electrodes.

18. An in-plane switching liquid crystal display device, comprising:
a gate line along a first direction and a data line along a second direction on a substrate, the gate and data lines crossing each other to define a pixel region;
a switch electrically connected to the gate and data lines;
a pixel electrode electrically connected to the switch, the pixel electrode having a plurality of portions;
a pixel connecting line parallel to the gate line, the pixel connecting line overlapping and contacting a drain electrode of the switch;
a common electrode with a plurality of parts that are alternately arranged with the portions of the pixel electrode to form blocks therebetween, and a width of at least one of the blocks is different than a width of another of the blocks, wherein widths of the blocks excluding the at least one block are the same, wherein the blocks in the pixel region are formed without overlapping with any of the plurality of portions of the pixel electrode or any of the plurality of parts of the common electrode in the pixel region;
a common line parallel with the gate line and connected to the common electrode, the common line connected to a common electrode in a next pixel region adjacent to the pixel region along the first direction and disposing between the gate line and a previous gate line adjacent to the gate line, wherein a first distance between the common line and the previous gate line is shorter than a second distance between the common line and the gate line, wherein the first distance is shorter than lengths of the pixel electrode and the common electrode, and the second distance is longer than the lengths of the pixel electrode and the common electrode; and
a gate insulating layer on the gate line and the common electrode, wherein the data line is on the gate insulating layer,
wherein the common electrode is branched directly from a side of the common line,
wherein the pixel electrode is branched directly from the pixel connecting line, and
wherein the common electrode and the common line are spaced apart from the pixel electrode and the pixel connecting line along the first and second directions,
wherein each of the parts and portions has the same width, wherein the width of the parts is the same as the width of the portions,
wherein the pixel electrode is formed in a plane higher than a plane where the common electrode is formed and does not overlap with the common electrode when viewed in a cross section taken along a thickness direction of the in-plane switching liquid crystal display device wherein one of the parts of the common electrode has a shorter length than the remaining parts of the common electrode.

19. The device according to claim 18, wherein the blocks most proximate to a center of the pixel region have a smaller width than the remaining blocks.

20. The device according to claim 18, wherein the widths of the blocks vary by more than 1 μm.

21. The device according to claim 18, wherein each of the portions has a first width, at least one of the parts has the first width and at least one of the parts has a second width smaller than the first width.

22. The device according to claim 21, wherein the at least one part having the first width is disposed more proximate to a center of the pixel region than the at least one part having the second width.

23. The device according to claim 22, wherein the at least one part having the first width is disposed between adjacent parts having the second width.

24. The device according to claim 22, wherein multiple parts have the second width, and at least one of the parts having the second width has a length different from lengths of the at least one part having the first width and the remaining parts having the second width.

25. The device according to claim 18, wherein a distance between each pair of adjacent parts in the pixel region is the same.

26. The device according to claim 18, wherein the parts and portions are symmetrically disposed around a line extending in a data line direction and passing through a center of the pixel region.

* * * * *